E. P. HOLMES.
GREASE CUP.
APPLICATION FILED MAY 12, 1913.
1,176,144.
Patented Mar. 21, 1916.
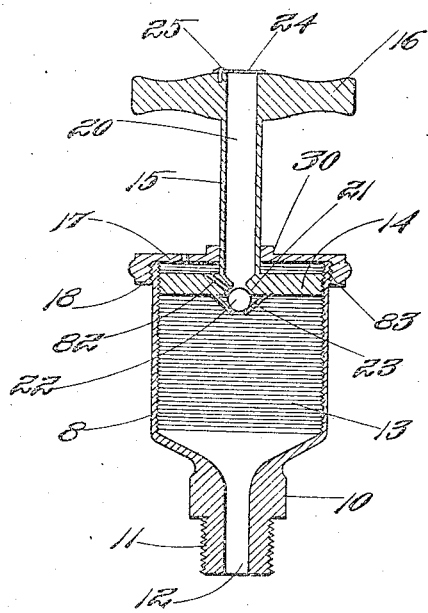

UNITED STATES PATENT OFFICE.

EDWIN P. HOLMES, OF BROOKLINE, MASSACHUSETTS.

GREASE-CUP.

1,176,144.

Specification of Letters Patent.   Patented Mar. 21, 1916.

Application filed May 12, 1913.   Serial No. 766,904.

*To all whom it may concern:*

Be it known that I, EDWIN P. HOLMES, a citizen of the United States, residing at Brookline, county of Norfolk, State of Massachusetts, have invented a certain new and useful Improvement in Grease-Cups, of which the following is a specification, reference being had therein to the accompanying drawings.

This invention has for its object to provide a grease cup which is more particularly intended to contain semi-solid grease or lubricant and which is of such construction that it may be readily filled by a grease-gun, when necessary, without removing its cover, and thus soiling the hands in replenishing the cup may be avoided.

The object of my invention, therefore, is to produce a cup which may be readily filled by a grease gun of common form, thereby doing away with the delay and inconvenience heretofore referred to.

It consists in certain novel features of construction and arrangement, all as hereinafter more fully set forth in the following description of a device embodying my invention, and illustrated in the accompanying drawings forming a part hereof.

The novel features of my invention are pointed out and clearly defined in the claim at the close of the specification.

In the drawings, the figure is a vertical section of a preferred form of device embodying my invention.

Having reference to the drawings, there is shown at 8 the cylindrical body portion of a grease cup. This is hollow and is provided at its lower end with an extension, the part 10 of which is adapted to receive a wrench and the part 11 of which is cylindrical and provided with threads, in order that the cup may be secured in position relative to the part to be lubricated. A passage 12 connects the interior of the cylindrical portion 8 with the lubricating passage to which the cup is secured.

The cylindrical body portion 8 is provided internally with threads 18 to receive a threaded plunger 14, to which is secured a stem 15, provided with a handle 16. A cover 17 with a depending flange 18 having internal threads is secured to the cylindrical portion by means of corresponding external threads 83 around its upper end. The cover has a central hole which loosely fits the stem 15 and on the upper side of the cover is a shoulder 30 about the hole to which a wrench may be applied to screw the cover on or off. The outer circumference of the depending flange is provided with a knurled portion 30 which is commonly used for screwing or unscrewing it.

The stem 15 hereinabove referred to is provided with a central passage 20 running longitudinally therethrough. I have shown the stem 15 as extending through the handle and the plunger so that the passage 20 connects the inside of the cylindrical portion of the grease cup with the outside. A valve is provided to close the inlet passage. In the drawings I have shown the valve as located at the inner end of the passage.

At 82, is shown a small air vent to permit the escape of air from the interior of the grease cup, said vent being so located that it will be covered by the valve when the valve is seated. I prefer to use a valve of the ball and socket type, which consists of a conical seat 21 and a ball 22 loosely retained beneath it by means of obliquely depending flanges 23. However any well known type of valve may be employed. At the upper end of the passage 20 is a cover which also may be of any desired construction. I prefer to employ what may be termed a swinging cover comprising a flat member 24 having a circular shape and large enough to cover the end of the passage. This may be secured at one side by a tightly fitting pin 25 about which it may be swung.

In order to fill the cup, the plunger is moved to the top of the cylindrical portion 8, that is to the position shown in the figure. The cover 24 is then swung away from the passage 20 and the grease gun nozzle is applied to the upper end of the passage. When the grease reaches the valve the ball 22 is forced away from the conical seat 21, thereby allowing the grease to enter the cylindrical portion of the cup. After the cup is thus filled, the cover 24 is swung over the passage 20, and when the plunger 14 is forced down, the pressure of the grease against the ball moves it against the valve seat 21, thereby preventing the grease from escaping by way of the passage 20 and forcing it into the bearing. However I do not limit myself to the form shown as it is obvious that my invention may be applied to other forms of grease cups by a skilled mechanic and without the exercise of the inventive faculty.

I regard my invention as particularly useful under circumstances where it is important that the person forced to fill the cups does not wish to be put to the delay and inconvenience of filling the cup by hand from a grease pail, as is often the case in motor vehicles, or the like.

My invention enables one cup after another to be filled very quickly by means of a grease gun, the operation of filling a relatively large number of cups, taking less time than it would to fill a single cup by the present method.

What I claim is:

The improved grease cup comprising a lubricant receptacle having an outlet passage, means for forcing the lubricant through said passage, an inlet passage, a valve to close said inlet passage, and an air vent, said air vent being also closed by said valve.

In testimony whereof I affix my signature, in presence of two witnesses.

EDWIN P. HOLMES.

Witnesses:
GEORGE P. DIKE,
ALICE H. MORRISON.